(12) United States Patent
Kim et al.

(10) Patent No.: US 11,972,756 B2
(45) Date of Patent: Apr. 30, 2024

(54) METHOD FOR RECOGNIZING THE VOICE OF AUDIO CONTAINING FOREIGN LANGUAGES

(71) Applicant: ActionPower Corp., Seoul (KR)

(72) Inventors: Kangwook Kim, Seoul (KR); Hwanbok Mun, Seoul (KR); Seungho Kwak, Seoul (KR)

(73) Assignee: ActionPower Corp., Seoul (KR)

( * ) Notice: Subject to any disclaimer, the term of this patent is extended or adjusted under 35 U.S.C. 154(b) by 99 days.

(21) Appl. No.: 17/946,847

(22) Filed: Sep. 16, 2022

(65) Prior Publication Data

US 2024/0005913 A1 Jan. 4, 2024

(30) Foreign Application Priority Data

Jun. 29, 2022 (KR) .......................... 10-2022-0079789

(51) Int. Cl.
| | | |
|---|---|---|
| *G10L 15/00* | (2013.01) | |
| *G06F 40/166* | (2020.01) | |
| *G06F 40/263* | (2020.01) | |
| *G06F 40/289* | (2020.01) | |
| *G10L 15/16* | (2006.01) | |
| *G10L 15/22* | (2006.01) | |

(52) U.S. Cl.
CPC ............ *G10L 15/16* (2013.01); *G06F 40/166* (2020.01); *G06F 40/263* (2020.01); *G06F 40/289* (2020.01); *G10L 15/005* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 7,117,231 B2 * | 10/2006 | Fischer | ................ H04N 21/235 |
| | | | 707/999.203 |
| 9,305,545 B2 | 4/2016 | Cheung | |
| 11,195,513 B2 | 12/2021 | Kurata et al. | |
| 2003/0065503 A1 * | 4/2003 | Agnihotri | ...... H04N 21/440236 |
| | | | 704/7 |
| 2005/0228676 A1 * | 10/2005 | Ifukube | ................... G10L 15/26 |
| | | | 704/E15.045 |
| 2019/0303797 A1 * | 10/2019 | Javali | ...................... G10L 15/22 |
| 2020/0160835 A1 * | 5/2020 | Bok | ........................ G10L 15/26 |

(Continued)

FOREIGN PATENT DOCUMENTS

| | | | |
|---|---|---|---|
| JP | H06150061 A | 5/1994 | |
| JP | 3009642 B2 | 2/2000 | |
| JP | 2004287444 A | 10/2004 | |

(Continued)

*Primary Examiner* — Satwant K Singh
(74) *Attorney, Agent, or Firm* — Seed IP Law Group

(57) ABSTRACT

Disclosed is a voice recognition method based on a neural network, performed by one or more processors of a computing device. The voice recognition method includes generating first text data based on a first language based on voice information. The method includes detecting problem text among the generated first text data. The method includes detecting a second language corresponding to the detected problem text. The method includes generating second text data based on the detected second language, in which the second language is different from the first language.

10 Claims, 5 Drawing Sheets

(56) References Cited

U.S. PATENT DOCUMENTS

2021/0158845 A1* 5/2021 Sethi .................. G06V 10/82
2022/0076679 A1* 3/2022 Wu ..................... G10L 15/22

FOREIGN PATENT DOCUMENTS

| JP | 4053440 B2 | 2/2008 |
|---|---|---|
| KR | 10-2018-0071029 A | 6/2018 |
| KR | 20180129486 A | 12/2018 |
| KR | 10-2019-0001434 A | 1/2019 |
| KR | 10-2020-0056712 A | 5/2020 |
| KR | 20200056712 A | 5/2020 |
| KR | 10-2021-0017090 A | 2/2021 |
| KR | 10-2022-0026958 A | 3/2022 |
| WO | WO 2020012813 A1 | 1/2020 |

* cited by examiner

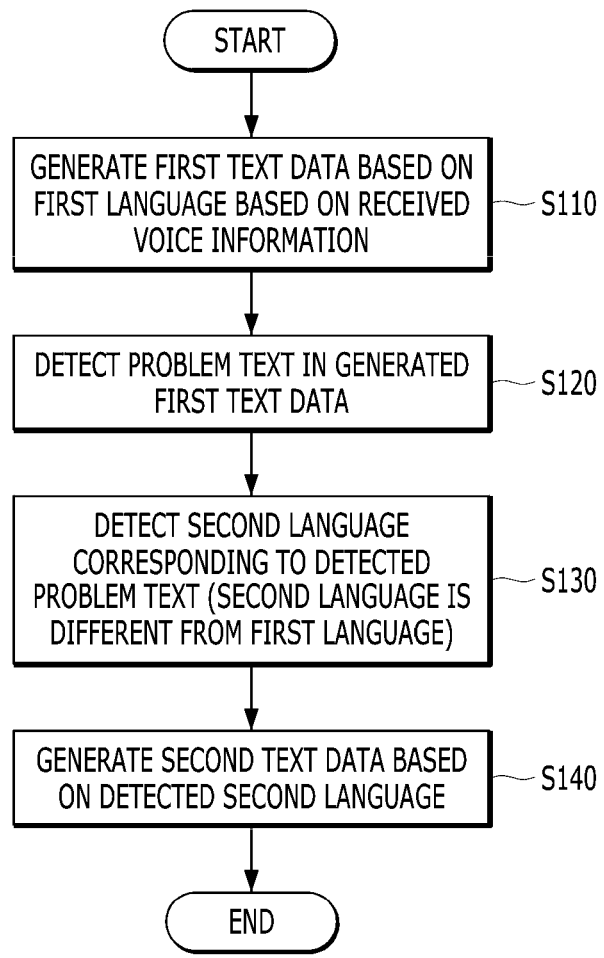
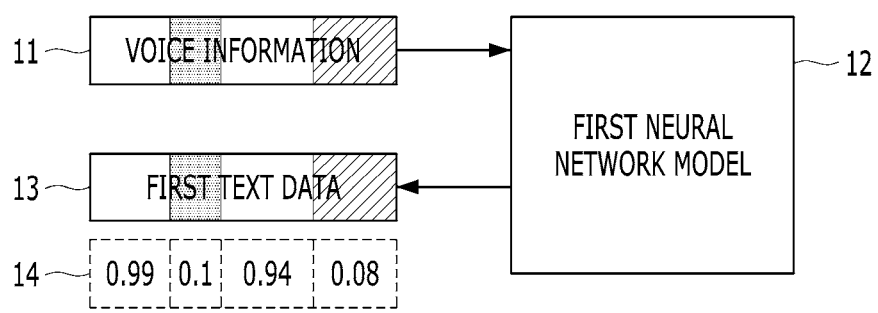

METHOD FOR RECOGNIZING THE VOICE OF AUDIO CONTAINING FOREIGN LANGUAGES

CROSS-REFERENCE TO RELATED APPLICATIONS

This application claims priority to and the benefit of Korean Patent Application No. 10-2022-0079789 filed in the Korean Intellectual Property Office on Jun. 29, 2022, the entire contents of which are incorporated herein by reference.

BACKGROUND

Technical Field

The present disclosure relates to a method of more clearly extracting an audio file including a foreign language voice as text, and more specifically, to a method of detecting a language with respect to an audio including a foreign language and extracting voice recognition result text more suitable to audio information.

Description of the Related Art

In the existing language model for performing voice recognition, when a foreign language is included in a sound source that is a target of voice recognition, there is a problem in that voice recognition is not performed properly for the corresponding part. For example, when the existing language model for performing voice recognition performs voice recognition on an audio file, such as news, containing a foreign language interview, there is a problem that voice recognition is not performed properly on the part of the interview with a foreigner.

In other words, when a plurality of languages are included in a sound source that is a voice recognition target, it is difficult for the existing language model for performing voice recognition to properly perform voice recognition.

PRIOR ART LITERATURE

Patent Document (Patent Document 1) KR 2018-0129486 A

BRIEF SUMMARY

In particular, the inventor has realized that in the models in the related art, when most of the target sound source is composed of a first language and only a part is composed of a second language, it is difficult for the models in the related art to properly recognize the part composed of the second language and convert that part into correct text. The reason is that although the models in the related art may be implemented in a form including a plurality of language recognition models, there is no technology capable of recognizing whether some of the sound sources are different types of language, and even though the models can recognize the corresponding part, there has been no technology for how to handle the corresponding part.

One or more embodiments of the present disclosure addresses one or more technical problems in the related art as well as the problem identified herein.

One or more embodiments of the present disclosure are capable of clearly recognizing a sound source including a foreign language voice and clearly converting the sound source into text based on the recognition.

One or more embodiments of the present disclosure provide a method of more accurately extracting an audio including a foreign language voice as text.

In order to solve the foregoing, an example embodiment of the present disclosure discloses a voice recognition method based on a neural network, performed by a computing device, the voice recognition method including: generating first text data based on a first language based on voice information; detecting problem text among the generated first text data; detecting a second language corresponding to the detected problem text; and generating second text data based on the detected second language, in which the second language is different from the first language.

Alternatively, the voice recognition method may further include outputting the corrected text together in a part corresponding to the problem text of the generated first text data.

Alternatively, the detecting of the problem text among the generated first text data may include deriving reliability of the generated first text data, and detecting the problem text based on the derived reliability.

Alternatively, the generating of the first text data based on the voice information may include: performing voice recognition for the first language based on the voice information using a first neural network model; and outputting texts in chunk units for the first language based on the voice recognition.

Alternatively, the deriving of the reliability of the generated first text data and the detecting of the problem text based on the derived reliability may include deriving reliability for each of texts in chunk units for the first language and detecting text in chunk units having reliability less than a set threshold.

Alternatively, the deriving of the reliability of the generated first text data and the detecting of the problem text based on the derived reliability may include deriving reliability in word units for the generated first text data and detecting text in word units having reliability less than a set threshold.

Alternatively, the second text data may include: a text part in which the problem text is excluded from the first text data; and for a voice part corresponding to the problem text, a corrected text part generated based on the second language.

Alternatively, the problem text may include at least one of chunk-unit text, sub-word-unit text, word-unit text, phrase-unit text, clause-unit text, or sentence-unit text.

Alternatively, the detecting of the second language corresponding to the detected problem text may further include: detecting a second language which corresponds to first problem text and is different from the first language; and detecting a third language which corresponds to second problem text and is different from the first language and the second language.

Alternatively, the generating of the second text data based on the detected second language may include: generating first corrected text based on the second language for a voice part corresponding to the first problem text; and generating second corrected text based on the third language for a voice part corresponding to the second problem text.

Another example embodiment of the present disclosure discloses a computer program stored in a computer readable storage medium, in which when the computer program is executed by one or more processors, the computer program causes the one or more processors to perform operations for voice recognition, the operations including: an operation of generating first text data based on a first language based on voice information; an operation of detecting problem text among the generated first text data; an operation of detecting a second language corresponding to the detected problem text; and an operation of generating second text data based on the detected second language, in which the second language is different from the first language.

Still another example embodiment of the present disclosure discloses a computing device, including: at least one processor; and a memory, in which the processor generates first text data based on a first language based on voice information, detects problem text among the generated first text data, detects a second language corresponding to the detected problem text, and generates second text data based on the detected second language, in which the second language is different from the first language.

According to the present disclosure, it is possible to provide the method of extracting an audio including a foreign language voice as text, and through this, it is possible to provide the method of detecting a language for an audio including a foreign language and extracting voice recognition result text that is more suitable for audio information.

On the other hand, the effect of the present disclosure is not limited to the above-mentioned technical benefits, and various benefits may be included within the range apparent to those skilled in the art from the content to be described below.

BRIEF DESCRIPTION OF THE SEVERAL VIEWS OF THE DRAWINGS

FIG. 3 is a flowchart illustrating a method for performing voice recognition of audio including a foreign language according to the example embodiment of the present disclosure.

FIG. 4 is a schematic diagram illustrating an operation of generating first text data based on voice information and deriving reliability according to the example embodiment of the present disclosure.

DETAILED DESCRIPTION

Figure 1:
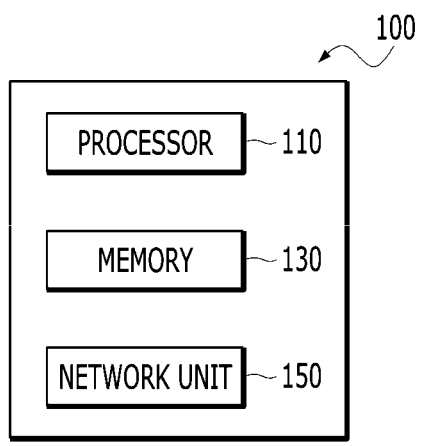
FIG. 1 is a block diagram illustrating a computing device for performing voice recognition according to an example embodiment of the present disclosure.

Various example embodiments will now be described with reference to drawings. In the present specification, various descriptions are presented to provide appreciation of the present disclosure. However, it is apparent that the example embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the example embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented example embodiments is provided so that those skilled in the art of the present disclosure use or implement the present disclosure. Various modifications to the example embodiments will be apparent to those skilled in the art. Generic principles defined herein may be applied to other embodiments without departing from the scope of the present disclosure. Therefore, the present disclosure is not limited to the example embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram illustrating a computing device for performing voice recognition according to an example embodiment of the present disclosure.

A configuration of the computing device 100 illustrated in FIG. 1 is only an example shown through simplification. In an example embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an example embodiment of the present disclosure. According to an example embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an example embodiment of the present disclosure, processors of a plurality of computing devices may be used together to process the learning of the network function and the data classification using the network function. Further, the computer program executed in the computing device according to an example embodiment of the present disclosure may be a CPU, GPGPU, or TPU executable program.

A processor 110 according to an example embodiment of the present disclosure may perform operations of recognizing voice information to perform voice recognition, generating first text data based on a first language based on the voice information, and detecting problem text from the generated first text data. In this case, the voice information may be information about a voice file or audio data including a foreign language.

According to the example embodiment of the present disclosure, the processor 110 may detect a second language corresponding to the detected problem text. Also, the processor 110 may generate second text data based on the detected second language, and the second language may be different from the first language. In the present disclosure, terms, such as "first," "second," and "third," are used to distinguish one constituent element from other constituent elements to maintain consistency throughout the specification, and the scope of rights should not be limited by the terms.

According to an example embodiment of the present disclosure, the memory 130 may store any type of information generated or determined by the processor 110 and any type of information received by the network unit 150.

According to an example embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an example embodiment of the present disclosure may use an arbitrary type known wired/wireless communication systems.

For example, the network unit 150 may receive voice information from an external system. In this case, the information received from the database may be data for training or data for inference for performing voice recognition of an audio including a foreign language. The voice information may include the information of the above-described examples, but is not limited to the above-described examples, and may be variously configured within a range that a person skilled in the art can understand.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150. In the meantime, the computing device 100 according to the example embodiment of the present disclosure is a computing system for transceiving information with the client through communication and may include a server. In this case, the client may be a predetermined type of terminal accessible to the server. For example, the computing device 100, which is a server, may generate a word graph from an external database, receive information for extracting summary sentences, generate a summary result for the conversation, and provide a user terminal with a user interface regarding the summary result for the conversation. In this case, the user terminal may output the user interface received from the computing device 100 that is the server, and receive or process information through interaction with the user.

In an additional example embodiment, the computing device 100 may also include any type of terminal that performs additional information processing by receiving a data resource generated in any server.

Figure 2:
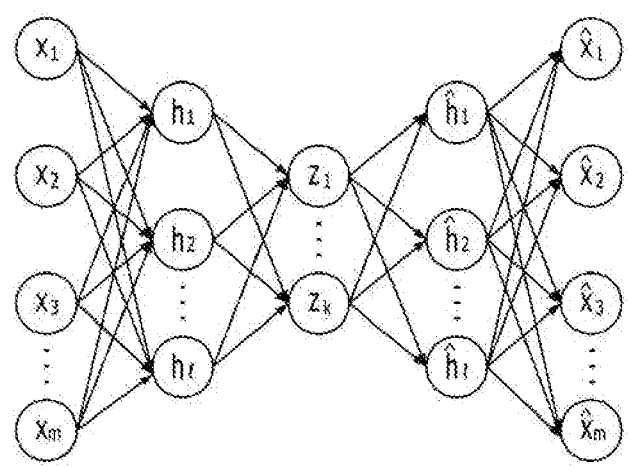
FIG. 2 is a schematic diagram illustrating a network function according to the example embodiment of the present disclosure.

FIG. 2 is a schematic diagram illustrating a network function according to an example embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an example embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another example embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another example embodiment of the present disclosure, the number of nodes of the input layer may be larger than the number of nodes of the output layer, and the neural network may be a neural network of a type in which the number of nodes increases from the input layer to the hidden layer. The neural network according to still yet another example embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an example embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

FIG. 3 is a flowchart illustrating a method for performing voice recognition of audio including a foreign language according to the example embodiment of the present disclosure.

The computing device 100 according to the example embodiment of the present disclosure may directly acquire or receive "voice information for performing voice recognition of an audio including a foreign language" from an external system. Voice information is information that is a target for generating text data through voice recognition according to the example embodiment of the present disclosure. The external system may be a server, a database, or the like that stores and manages voice information. The computing device 100 may use voice information directly acquired or received from the external system as "input data for generating text through voice recognition."

Referring to FIG. 3, the computing device 100 may generate first text data based on a first language based on the received voice information (S110). For example, the computing device 100 may perform voice recognition for the first language based on voice information, and may output texts for the first language based on the voice recognition. Herein, the text output may include chunk-unit text, sub-word-unit text, word-unit text, phrase-unit text, clause-unit text, sentence-unit text, and the like, and in addition to types, and may include various types of text.

The computing device 100 may detect the problem text based on the first text data generated in operation S110 (S120). Operation S120 may include an operation of deriving reliability of the generated first text data and detecting the problem text based on the derived reliability. That is, in operation S120, the problem text may be detected based on reliability information associated with the first text data. A specific example embodiment based on the reliability information will be described below with reference to FIGS. 4 and 5. Meanwhile, in operation S120, a plurality of problem texts may also be detected based on the first text data. For example, operation S120 may also detect a plurality of problem texts including first problem text, second problem text, and the like. A specific example embodiment in which the plurality of problem texts is detected will be described below with reference to FIG. 6.

The computing device 100 may detect a second language corresponding to the problem text detected through operation S120 (S130). In this case, the second language may be different from the first language. That is, the second language may be a foreign language in relation to the first language. Also, when the plurality of problem texts are detected in operation S120, the computing device may also detect a plurality of languages different from the first language. For example, operation S130 may further include an operation of detecting a second language which corresponds to the first problem text and is different from the first language, and an operation of detecting a third language which corresponds to the second problem text and is different from the first language and the second language.

The computing device 100 may generate second text data based on the second language detected in operation S130 (S140). Here, the second text data may include a text part in which the problem text is excluded from the first text data, and a corrected text part generated based on the second language with respect to a voice part corresponding to the problem text. In addition, operation S140 may include generating a plurality of corrected texts when the plurality of problem texts is detected in operation S120 and the plurality of languages are detected in operation S130. For example, operation S140 may include an operation of generating first corrected text based on the second language for the voice part corresponding to the first problem text, and an operation of generating a second corrected text based on the third language for the voice part corresponding to the second problem text.

The computing device 100 may further include, after operation S140, an operation of outputting the corrected text together in a part corresponding to the problem text of the generated first text data.

FIG. 4 is a schematic diagram illustrating an operation of generating first text data based on the voice information and deriving reliability according to the example embodiment of the present disclosure.

Referring to FIG. 4, the computing device 100 according to the example embodiment of the present disclosure may receive voice information 11 from an external system in order to extract an audio including a foreign language voice (for example, a second language) as text.

In this case, the voice information 11 may include voice information about foreign language conversation, voice information about an interview including several foreign languages, foreign language voice information included in a news video, and the like, and various voices may be included in addition to these examples. As such, the voice information is not limited to one specific language and may include voice information including various foreign languages that need to be extracted as text.

The computing device 100 may output first text data 13 by using voice information received from the external system as input data for performing voice recognition. For example, in the example of FIG. 4, the computing device 100 may perform voice recognition for a first language by inputting voice information to a first neural network model 12, and output text in chunk units for the first language based on the voice recognition. Here, the chunk is a word mass having a single meaning, and means a unit that can be used to segment text in natural language processing (NLP), and the length of the chunk may be variable. Also, the computing device 100 may perform Speech-To-Text (STT) or Automatic Voice recognition (ASR) by using the first neural network model 12. The STT or ASR may receive a voice signal or a spectrogram converted from a voice signal as input data and output a text in the form of a character string. Through this, the first text data 13 that is a result of performing the voice recognition on the first language may be generated.

The computing device 100 may derive reliability 14 of the generated first text data. For example, the reliability 14 of the first text data, which is the result generated by performing the voice recognition on the voice information, may be calculated. The process of calculating the reliability may be a process of predicting how reliable the ASR result is without information on a correct answer. For example, in the example of FIG. 4, reliability of (0.99), (0.1), (0.94), and (0.08) may be derived for the text in the chunk unit for the first language.

Although the present disclosure has been described based on the reliability 14 of the first text data for the simple description, the reliability 14 is not limited to being calculated based on the first text data 13 after the first text data 13 is generated. For example, the first neural network model 12 may predict the text for each chunk when voice recognition is performed in the first language on the voice information 11, and derive the reliability 14 corresponding to the accuracy of the text predicted for each chunk. That is, the reliability 14 of the first text data may be derived in the process of generating the first text data 13 or may be derived based on the generated first text data 13.

In addition, although the reliability was calculated for texts in chunk units in the reliability derivation process, reliability may be calculated for texts of various units in addition to texts in chunk units. For example, reliability may also be derived for sub-word-unit text, word-unit text, phase-unit text, and clause-unit text. On the other hand, the reliability 14 of the first text data calculated through this may be used as a basis for detecting the problem text, and detailed contents will be described with reference to FIG. 5 below.

Figure 5:
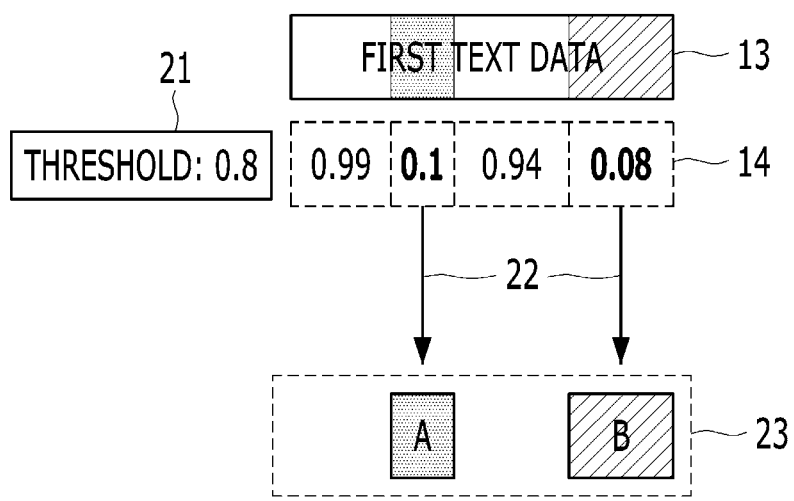
FIG. 5 is a schematic diagram illustrating an operation of deriving the reliability of the first text data and detecting problem text based on the derived reliability according to the example embodiment of the present disclosure.

FIG. 5 is a schematic diagram illustrating an operation of deriving the reliability of the first text data and detecting problem text based on the derived reliability according to the example embodiment of the present disclosure.

According to an example embodiment of the present disclosure, the computing device 100 may derive reliability 14 of the generated first text data, and detect a problem text based on the derived reliability 14. Also, in this case, a plurality of problem texts 23 may be detected. Specifically, the computing device 100 may detect 22 text in chunk units having a reliability less than the set threshold 21. For example, in a process 22 of detecting text having reliability less than a threshold in the example of FIG. 5, a threshold 21 may be set to 0.8, and texts in the chunk unit having reliability of (0.1) and (0.08) less than 0.8 that is the set threshold 21 may be detected as a plurality of problem texts 23. Specifically, when the first language is Korean, the first text data 13 may be a result of voice recognition performed based on Korean, and when the reliability of a part of the first text data has a value less than the threshold of 0.8, the corresponding part may be detected as a problem text (the corresponding part is predicted to correspond to text including a foreign language other than Korean). Additionally, as described above with reference to FIG. 4, according to the example embodiment of the present disclosure, reliability may be derived for the first text data 13 in word units, and text in the word unit having reliability less than the set threshold may be detected. In addition, reliability may be derived in units of words, phrases, clauses, sentences, and the like, in addition to chunk units and sub-word units. Accordingly, the problem text 23 is not limited to text in chunk units, and may include text in various units. Language detection may be performed on the plurality of detected problem texts 23, which will be described in detail below with reference to FIG. 6.

Figure 6:
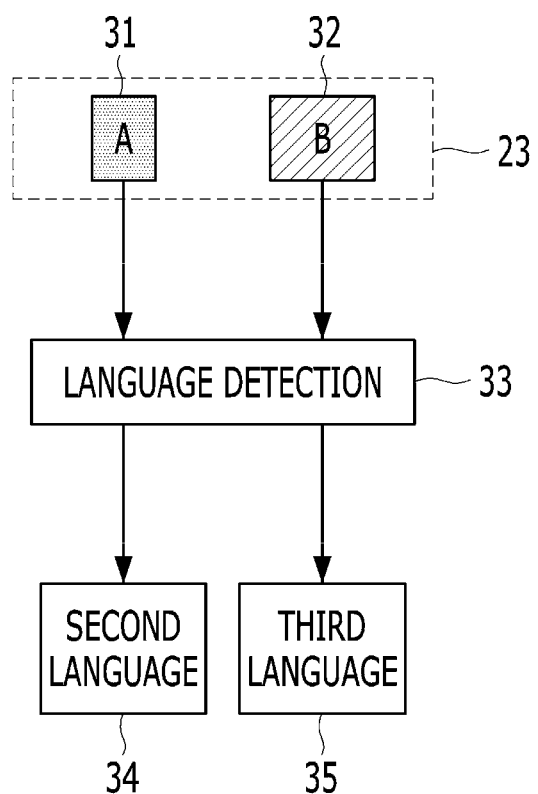
FIG. 6 is a schematic diagram illustrating an operation of detecting a plurality of problem texts (for example, first problem text and second problem text) and detecting a plurality of languages (for example, a second language and a third language) corresponding to the plurality of detected texts according to the example embodiment of the present disclosure.

FIG. 6 is a schematic diagram illustrating an operation of detecting a plurality of problem texts (for example, first problem text and second problem text) and detecting a plurality of languages (for example, a second language and a third language) corresponding to the plurality of detected texts according to the example embodiment of the present disclosure.

According to the example embodiment of the present disclosure, the computing device 100 may detect a plurality of languages corresponding to the plurality of detected problem texts 23. Specifically, the computing device 100 may detect a second language 34 which corresponds to the first problem text 31 and is different from the first language through a language detection 33, and through the same process, the computing device 100 may detect a third language 35 which corresponds to the second problem text 32 and is different from the first language and the second language. In this case, the model used when the computing device 100 performs the language detection 33 may be a neural network model, an algorithm-based language detection model, or Spoken Language Identification (LID), and technologies for distinguishing a language included in a voice based on given voice information may be used. For example, reliability of the first language is calculated based on Korean, and for the problem text in the chunk unit whose calculated reliability has a value less than the set threshold 21, the second language 34 corresponding to the first problem text 31 may be detected as English, and the third language 35 corresponding to the second problem text 32 may be detected as Chinese. In this case, English, which is different from the first language, Korean, may be detected as the second language 34, and Chinese different from Korean and English may be detected as the third language 35. In the present disclosure, terms, such as "first," "second," and "third," are used to distinguish one constituent element from other constituent elements to maintain consistency throughout the specification, and the scope of rights should not be limited by the terms. In addition, in some example embodiments according to the present disclosure, when it is not necessary to distinguish two or more languages from each other, and thus the referent is clear as one language, the third language 35 may not be detected. For example, as a result of the language detection 33 being performed on the first problem text 31 and the second problem text 32, the corresponding language may be detected as English for both the problem texts. In this case, English corresponding to the two problem texts may be detected as the second language 34, and the third language 35 that is not different from the second language may not be detected. Also, the computing device 100 may generate second text data based on at least one detected language (different from the first language), which will be described in detail below with reference to FIG. 7.

Figure 7:
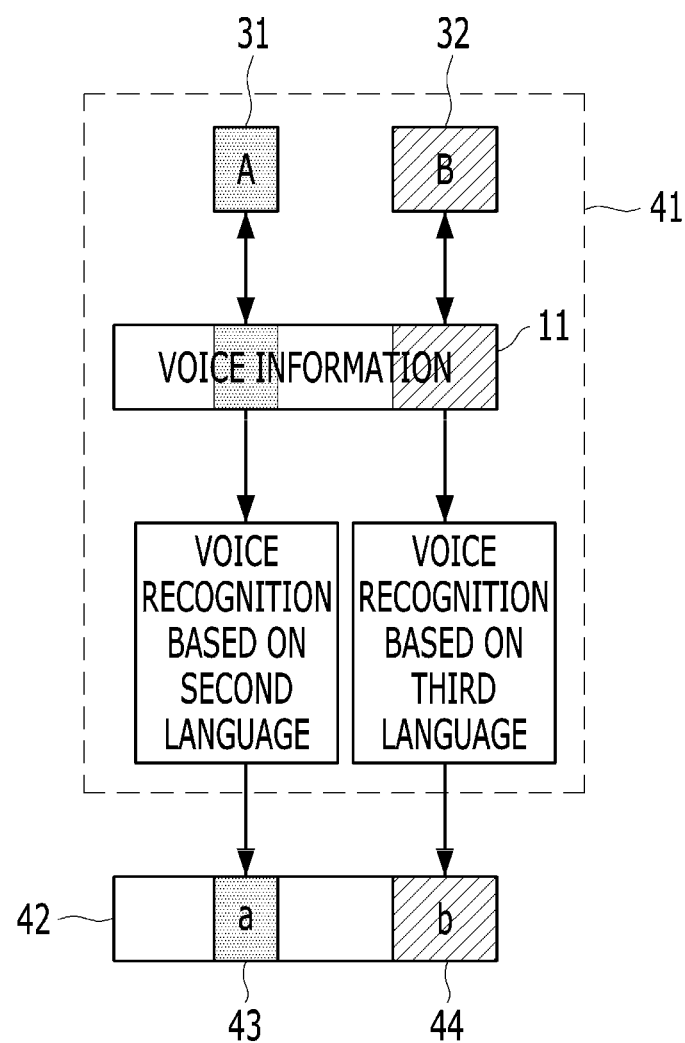
FIG. 7 is a schematic diagram illustrating a process of generating second text data based on at least one detected language (different from the first language) according to the example embodiment of the present disclosure.

FIG. 7 is a schematic diagram illustrating a process of generating second text data based on at least one detected language (different from the first language) according to the example embodiment of the present disclosure.

First, according to the example embodiment of FIG. 6, the second language 34 and the third language 35 corresponding to the first problem text 31 and the second problem text 32 may be detected. Based on this, referring to FIG. 7, the voice recognition based on the second language 34 and the voice recognition based on the third language 35 may be performed for the parts corresponding to the first problem text 31 and the second problem text 32 in the voice information, respectively (41). For example, when the language corresponding to the first problem text 31 is detected as English, and the language corresponding to the second problem text 32 is detected as Chinese, the voice recognition based on English and the voice recognition based on Chinese may be performed on the parts corresponding to the first and second problem texts in the voice information 11, respectively. Also, in other example embodiments according to the present disclosure, when the language corresponding to the first problem text 31 and the second problem text 32 is clear as one language, the third language 35 may not be detected. For example, as a result of the language detection 33 being performed on the first problem text 31 and the second problem text 32, the corresponding language may be detected as English for both the problem texts. In this case, English corresponding to the two problem texts may be detected as the second language 34, and the third language 35 that is not different from the second language may not be detected, and the voice recognition based on English may be performed on both the parts corresponding to the first problem text and the second problem text.

According to an example embodiment of the present disclosure, the computing device 100 may generate first corrected text 43 based on the second language 34 with respect to a voice part corresponding to the first problem text 31, and generate a second corrected text 44 based on the third language 35 for the voice part corresponding to the second problem text 32, and second text data may be generated based on these operations. For example, the voice recognitions based on English and Chinese are performed on the parts corresponding to the first and second problem texts in the voice information, respectively, so that "first corrected text as a result of the voice recognition based on English" and "second corrected text as a result of the voice recognition based on Chinese" may be generated. In addition, as another example embodiment, when the languages corresponding to the first problem text 31 and the second problem text 32 are both English, the voice recognition based on English is performed on both the parts corresponding to the first and second problem texts in the voice information, so that "first corrected text and second corrected text that are the results of the voice recognition based on English" may be generated.

As the present disclosure is performed, language detection is not performed on all parts of voice information including a foreign language, but language detection is performed only on some low-reliability parts, and then the result of the voice recognition performed based on the corresponding language is output, so that a text result that better matches the voice content may be output.

According to the example embodiment of the present disclosure, the computing device 100 may output the corrected texts 43 and 44 together in the part corresponding to the problem text 23 of the generated first text data 13. For example, when the first language is Korean, the second language 34 is English, and the third language 35 is Chinese, the first problem text 31 part of the problem text 23 of the first text data 13 may be output together the first corrected text 43, which is the text result of the voice recognition performed based on English, and the second problem text 32 part may be output together with the second corrected text 44, which is the text result of the voice recognition performed based on Chinese. According to another example embodiment, when the corrected text is accompanied and output together, a notification stating that "the foreign language text is output together in a part that may be a foreign language" may be output together.

According to another example embodiment of the present disclosure, when the computing device 100 receives a video, such as a news video, together with the voice information 11 as an input, and performs voice recognition, the computing device 100 may determine whether there is a subtitle in a video part corresponding to the detected problem text 23. At this time, when there is a subtitle in the video part corresponding to the problem text 23, the computing device 100 may detect the part where the subtitle appears in the video and obtain the corresponding subtitle part through Optical Character Recognition (OCR). In addition, the subtitle information obtained through OCR may be output together with corrected texts 43 and 44 in "the part corresponding to the problem text 23 of the first text data 13 generated through voice recognition." For example, a foreigner interview may be included when a briefing of a situation that occurred abroad is included in news videos, and in this case, subtitle information may be included in the foreigner interview. In this case, the text corresponding to the utterance part of the foreigner interview in the news video may be detected as the problem text 23, and when there is a subtitle in "the part corresponding to the utterance part of the foreigner interview in the news video," the subtitle part may be obtained through OCR. In addition, the subtitle information obtained through OCR may be output together with the corrected texts 43 and 44 in "the part corresponding to the problem text 23 of the first text data 13 generated through voice recognition."

Figure 8:
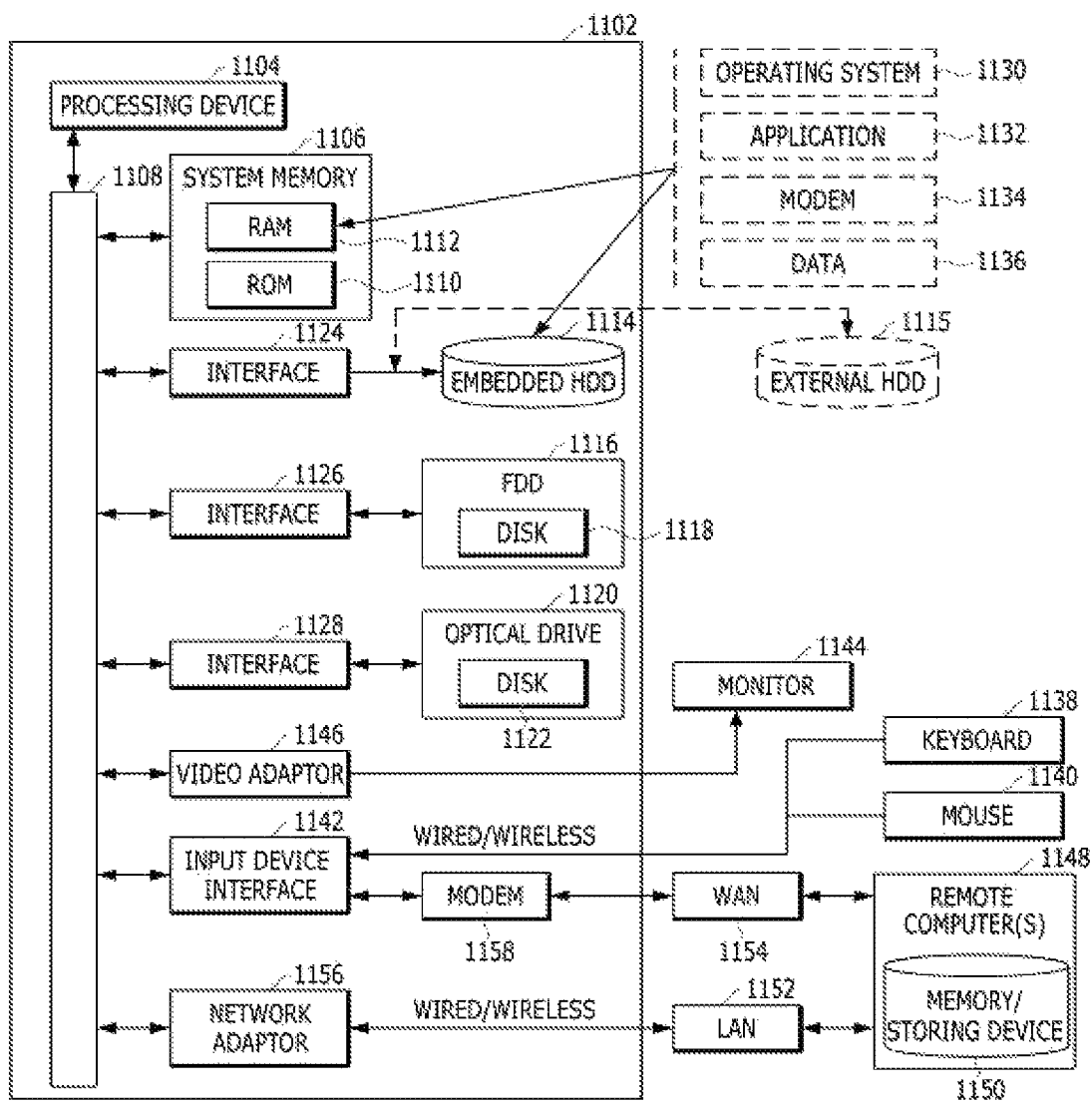
FIG. 8 is a simple and general schematic diagram for an example of a computing environment in which example embodiments of the present disclosure are implementable.

FIG. 8 is a normal and schematic view of an example computing environment in which the example embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The example embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An example environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an example operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is example and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various example logical blocks, modules, processors, means, circuits, and algorithm steps described in association with the example embodiments disclosed herein may be implemented by electronic hardware, various types of programs or design codes (for easy description, herein, designated as software), or a combination of all of them. In order to clearly describe the intercompatibility of the hardware and the software, various example components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various example embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of example accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented example embodiments is provided so that those skilled in the art of the present disclosure use or implement the present disclosure. Various modifications of the example embodiments will be apparent to those skilled in the art and general principles defined herein can be applied to other example embodiments without departing from the scope of the present disclosure. Therefore, the present disclosure is not limited to the example embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voice recognition method based on a neural network, performed by a computing device, the voice recognition method comprising:
   receiving a video containing voice information;
   generating first text data based on a first language based on the voice information; determining reliability of the generated first text data and detecting problem text with the reliability less than a set threshold;
   detecting a second language corresponding to the detected problem text;
   generating second text data based on the detected second language,
   determining the presence of subtitles in a part of the video corresponding to the problem text in the video;
   when subtitles exist in the part of the video, obtaining subtitle text of the part of the video based on OCR (Optical Character Recognition); and
   outputting the obtained subtitle text together with the second text data in a part corresponding to the problem text;
   wherein the second language is different from the first language;
   wherein the determining the reliability of the generated first text data and detecting problem text with the reliability less than a set threshold includes;
   deriving reliability for each of texts in chunk units for the first language and detecting text in chunk units having reliability less than the set threshold as the problem text.

2. The voice recognition method of claim 1, wherein the generating of the first text data based on the voice information includes:
   performing voice recognition for the first language based on the voice information using a first neural network model; and
   outputting texts in chunk units for the first language based on the voice recognition.

3. The voice recognition method of claim 2, wherein the deriving of the reliability of the generated first text data and the detecting of the problem text based on the derived reliability includes:
   deriving reliability in word units for the generated first text data and detecting text in word units having reliability less than a set threshold.

4. The voice recognition method of claim 1, wherein the second text data includes:
   a text part in which the problem text is excluded from the first text data; and
   for a voice part corresponding to the problem text, a corrected text part generated based on the second language.

5. The voice recognition method of claim 4, further comprising:
   outputting the corrected text together in a part corresponding to the problem text of the generated first text data.

6. The voice recognition method of claim 1, wherein the problem text includes at least one of chunk-unit text, sub-word-unit text, word-unit text, phrase-unit text, clause-unit text, or sentence-unit text.

7. The voice recognition method of claim 1, wherein the detecting of the second language corresponding to the detected problem text further includes:
   detecting a second language which corresponds to first problem text and is different from the first language; and
   detecting a third language which corresponds to second problem text and is different from the first language and the second language.

8. The voice recognition method of claim 7, wherein the generating of the second text data based on the detected second language includes:
   generating first corrected text based on the second language for a voice part corresponding to the first problem text; and
   generating second corrected text based on the third language for a voice part corresponding to the second problem text.

9. A computer program stored in a non-transitory computer readable storage medium, in which when the computer program is executed by one or more processors, the computer program causes the one or more processors to perform operations for voice recognition, the operations comprising:
   an operation of receiving a video containing voice information; an operation of generating first text data based on a first language based on the voice information;
   an operation of determining reliability of the generated first text data and detecting problem text with the reliability less than a set threshold among the generated first text data;
   an operation of detecting a second language corresponding to the detected problem text; and
   an operation of generating second text data based on the detected second language;
   an operation of determining the presence of subtitles in a part of the video corresponding to the problem text in the video;
   when subtitles exist in the part of the video, an operation of obtaining subtitle text of the part of the video based on OCR (Optical Character Recognition); and
   an operation of outputting the obtained subtitle text together with the second text data in a part corresponding to the problem text;
   wherein the second language is different from the first language, wherein the operation of determining the reliability of the generated first text data and detecting problem text with the reliability less than a set threshold includes:
an operation of deriving reliability for each of texts in chunk units for the first language and detecting text in chunk units having reliability less than the set threshold as the problem text.

10. A computing device, comprising:

at least one processor; and a memory, wherein said at least one processor receives a video containing voice information generates first text data based on a first language based on the voice information, determines reliability of the generated first text data and detects problem text with the reliability less than a set threshold, detects a second language corresponding to the detected problem text, generates second text data based on the detected second language, determines the presence of subtitles in a part of the video corresponding to the problem text in the video, when subtitles exist in the part of the video, obtains subtitle text of the part of the video based on OCR (Optical Character Recognition), and outputs the obtained subtitle text together with the second text data in a part corresponding to the problem text, wherein the second language is different from the first language, wherein the determining the reliability of the generated first text data and detecting problem text with the reliability less than a set threshold includes: deriving reliability for each of texts in chunk units for the first language and detecting text in chunk units having reliability less than the set threshold as the problem text.

* * * * *